United States Patent [19]

Kassai

[11] 4,265,466
[45] May 5, 1981

[54] BABY CARRIAGE

[75] Inventor: Kenzou Kassai, Osaka, Japan

[73] Assignee: Kassai Kabushikikaisha, Osaka, Japan

[21] Appl. No.: 62,911

[22] Filed: Aug. 2, 1979

[30] Foreign Application Priority Data

Dec. 15, 1978 [JP] Japan .................................. 53-155283

[51] Int. Cl.³ ................................................ B62B 7/08
[52] U.S. Cl. .................................. 280/648; 280/47.38; 297/45; 297/317
[58] Field of Search ............... 280/642, 644, 649, 647, 280/650, 47.38, 47.4, 47.41, 42, 648; 297/45, 350, 351, 317, 320, 341, 457

[56] References Cited

U.S. PATENT DOCUMENTS

| 2,781,225 | 2/1957 | Heideman | 280/648 |
| 3,252,734 | 5/1966 | Berlin | 297/317 |
| 4,072,318 | 2/1978 | Laune | 280/650 |
| 4,094,531 | 6/1978 | Cabagnero | 280/649 |

FOREIGN PATENT DOCUMENTS 2369957  7/1978  France .................................... 280/648

Primary Examiner—David M. Mitchell
Attorney, Agent, or Firm—W. G. Fasse; D. F. Gould

[57] ABSTRACT

A baby carriage comprises a pair of left and right hammock supporting rods pivotally and selectively fixedly provided to a pair of left and right pushing rods. A hammock is supported between the pair of hammock supporting rods. The hammock comprises a sheet, and a sitting portion and a back portion made of hard core members fixed along the sheet plane. A hammock shaping member is provided to extend between the pair of pushing rods in sliding contact with the lower surface of the hammock, so that the tilt angle of the back portion is changed in accordance with turning of the hammock supporting rods while the sitting portion slides on the hammock shaping member, whereby the crossing angle between the sitting portion and the back portion is changed.

11 Claims, 19 Drawing Figures

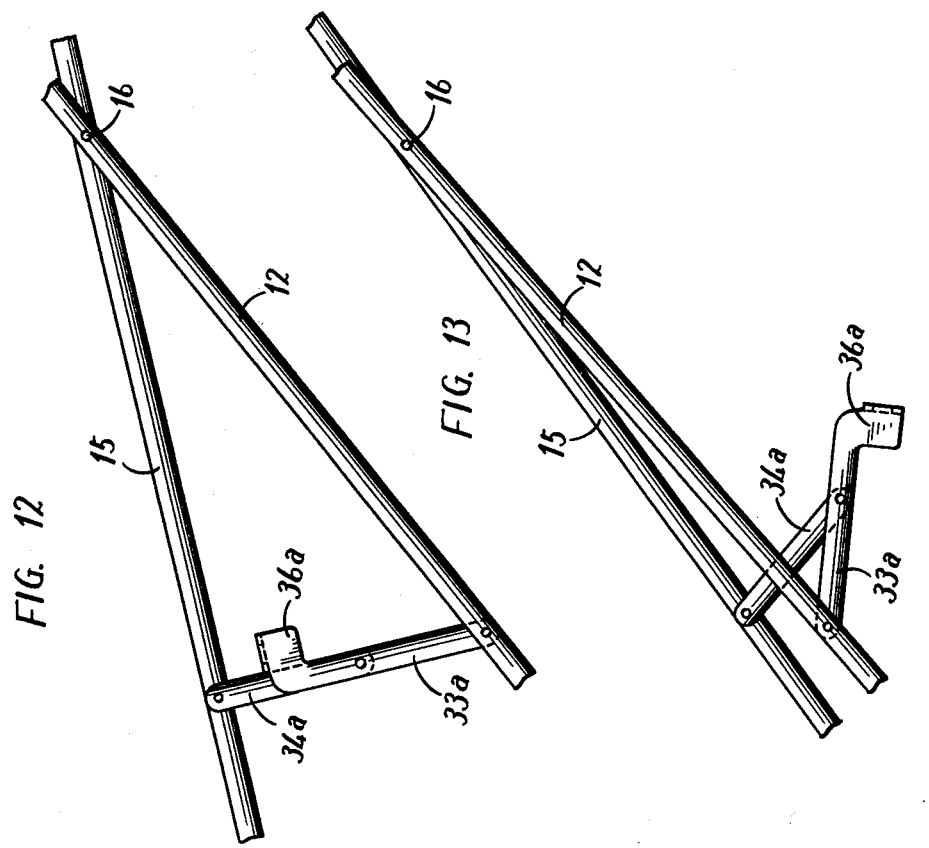
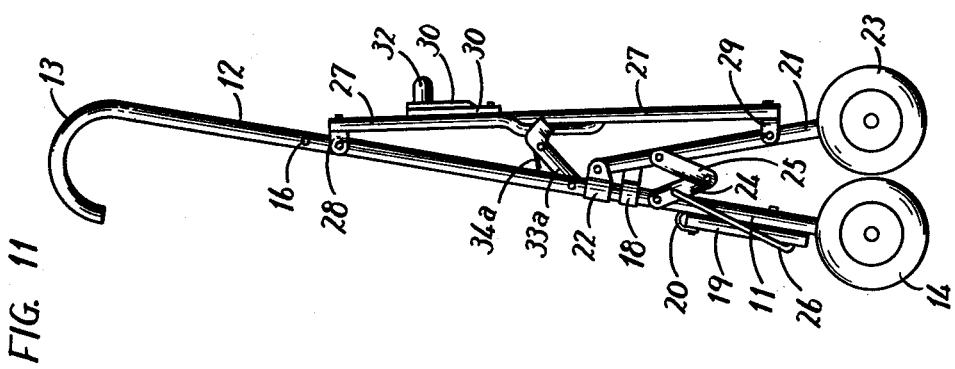

BABY CARRIAGE

BACKGROUND OF THE INVENTION

1. Field of the Invention

The present invention relates to a baby carriage and more particularly to a baby carriage having an hammock with a reclining mechanism.

2. Description of the Prior Art

FIG. 1 is a view of a major portion of a conventional baby carriage comprising a hammock with a reclining mechanism. It is pointed out that FIG. 1 shows a side view of such a conventional baby carriage. The baby carriage shown comprises a pair of left and right hammock supporting rods 1 provided to extend in parallel with each other. The pair of hammock supporting rods 1 are pivotally mounted at pivotal points 2 to a pair of left and right main rods, not shown, which constitute a portion of the body of the baby carriage, such that the tilt angle of the hammock supporting rods 1 can be adjusted. A hammock 5 having a sitting portion 3 and a back portion 4 is fixedly provided to the hammock supporting rods 1. Accordingly, the back portion 4 of the hammock 5 is tilted as desired, thereby to achieve a desired reclined condition, as the hammock supporting rods 1 are tilted to a reclined state as shown in a phantom line.

However, since the above described hammock 5 is fixedly provided to the hammock supporting rods 1, the sitting portion 3 could assume a rising attitude when the back portion 4 is brought to a reclined state. More specifically, the crossing angle between the sitting portion 3 and the back portion 4 remains the same. This means that the hammock 5 forces a baby sitting thereon to assume an unnatural posture.

As regards the crossing angle between the sitting portion 3 and the back portion 4 of the hammock, it has been stipulated under the Japanese safety standard that the crossing angle for a normal sitting posture should be more than 110° and that for a reclined posture should be more than 130°. Accordingly, the reclining mechanism as shown in FIG. 1 cannot meet the above described safety standard.

SUMMARY OF THE INVENTION

According to the present invention, the crossing angle between the sitting portion and the back portion of a hammock in a baby carriage is not fixed but rather may be changed as a function of a reclined state.

In summary, the present invention comprises a baby carriage including a carriage body including a pair of left and right members, and wheels provided at the bottom of the carriage body for rotation on the ground. The pair of left and right members are provided with a pair of left and right parallel extending hammock supporting rods in a pivotal or a tilt angle adjustable manner, such that the tilt angle can be fixed as desired by means of a proper fixing means. A hammock is supported between the pair of hammock supporting rods. The hammock is stretched between the pair of hammock supporting rods and comprises a sheet slacked to a dish like shape. Accordingly, the sheet can be deformed to any desired shape while the same is wrinkled. A sitting portion and a back portion are formed on the above described deformable sheet. The sitting portion and the back portion each comprise relatively hard core members to achieve the hardness desired as a sitting portion and a back portion. The core members achieving a sitting portion and the core members achieving a back portion are slightly spaced apart from each other, so that the angle between both core members can be changed by virtue of the bendability of a portion of the sheet between both core members. A change of the crossing angle between both core members could change the distribution of the wrinkles caused throughout the sheet. The nature of deformability of the hammock by virtue of the above described sheet allows for a change of the crossing angle between the sitting portion and the back portion of the hammock. Deformation of the hammock is achieved by a hammock shaping member provided on the carriage body in selective contact with the lower surface of the hammock.

In a preferred embodiment, a hammock shaping member is provided at the position in relative sliding contact with the lower surface of the sitting portion of the hammock. As a result, the sitting portion is slidable on the hammock shaping member when the pair of hammock supporting rods are turned to change the tilt angle of the back portion of the hammock. Since the sitting portion is normally placed in a state of being supported or sustained by the fixed hammock shaping member, a change of the tilt angle of the sitting portion is much smaller than a change of the tilt angle of the back portion, while the crossing angle between the sitting portion and the back portion is changed.

In another preferred embodiment of the present invention, the hammock supporting rods are structured such that the tilt angle thereof can be adjusted to a first and second states. A supporting base is further provided to be in contact with the lower surface of the hammock when the hammock supporting rods are brought to the first state. On the other hand, the hammock shaping member is structured such that the same is in contact with the lower surface of the sitting portion and thus sustain upward the lower surface of the sitting portion when the hammock supporting rods are brought to the second state. Accordingly, a contact of the supporting base or a contact of the hammock shaping member is selectively achieved, whereby the crossing angle between the sitting portion and the back portion is changed.

Accordingly, a principal object of the present invention is to provide a baby carriage comprising a hammock with a reclining mechanism wherein the crossing angle between a sitting portion and a back portion of the hammock is increased in a reclined state.

Another object of the present invention is to provide a baby carriage comprising a hammock with a reclining mechanism of an inexpensive cost and of a simple structure, wherein a nature of deformation of a sheet to an arbitrary shape with wrinkles formed is advantageously utilized.

A further object of the present invention is to provide a baby carriage comprising a hammock with a reclining mechanism, wherein a baby can always assume a natural posture in any reclined state.

These objects and other objects, features, aspects and advantages of the present invention will become more apparent from the following detailed description when taken in conjunction with the accompanying drawings.

BRIEF DESCRIPTION OF THE DRAWINGS

FIG. 11 is a side view showing the framework, as collapsed, of the FIG. 10 baby carriage;

FIG. 12 is an enlarged side view of the portion marked B shown in FIG. 10;

FIG. 13 is a side view of the portion marked B in a state different from that shown in FIG. 12;

DESCRIPTION OF THE PREFERRED EMBODIMENTS

Figure 1:
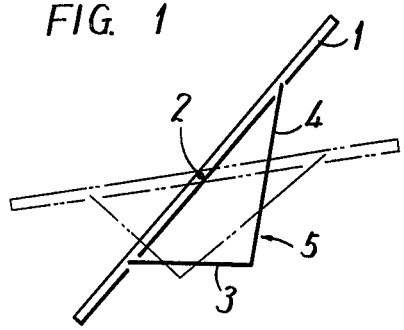
FIG. 1 is a view of a major portion of a conventional baby carriage comprising a hammock with a reclining mechanism.
Figure 2:
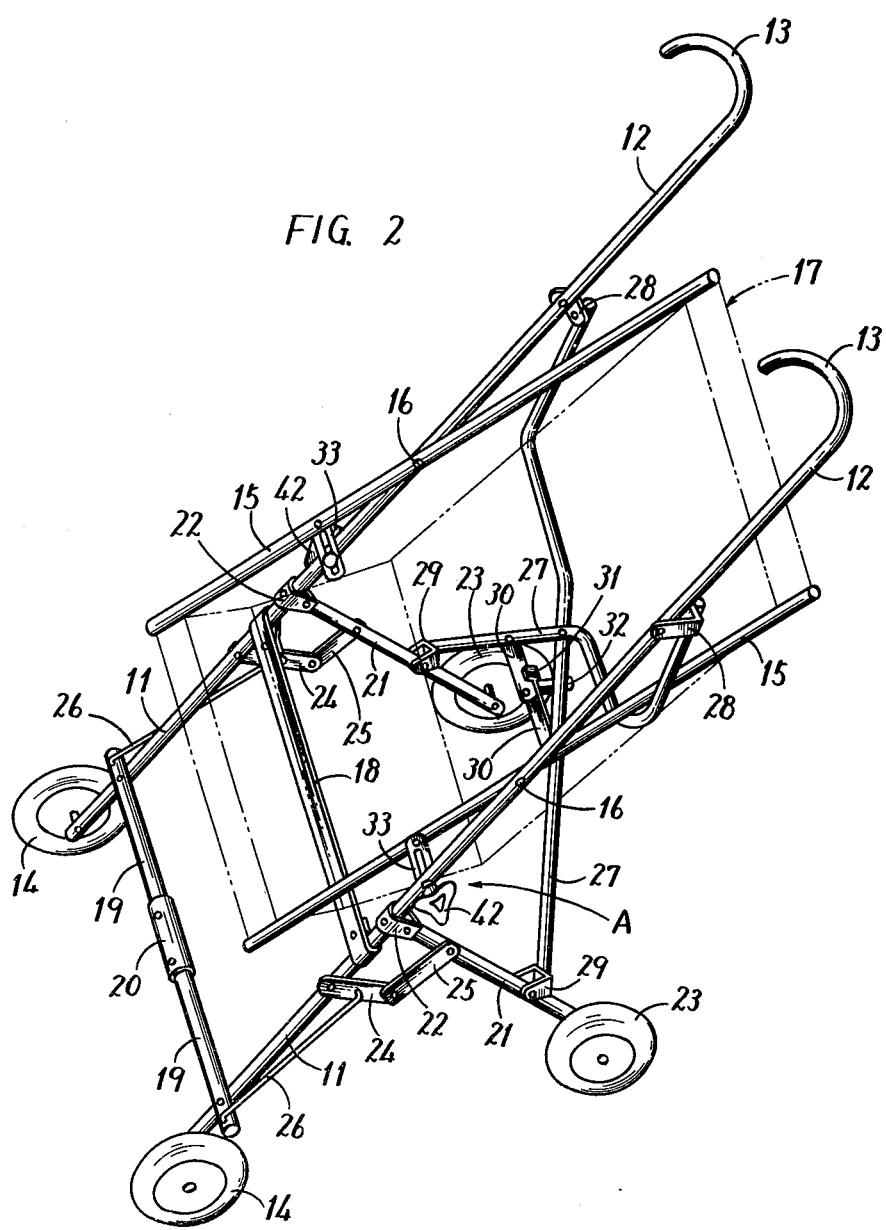
FIG. 2 is a perspective view showing a framework of an example of a baby carriage wherein the present invention can be advantageously employed and for use in explaining an outline of one embodiment of the present invention.
Figure 3:
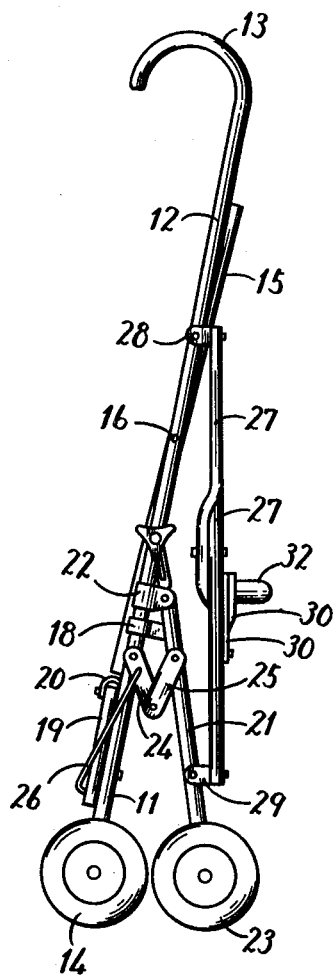
FIG. 3 is a side view of the framework, as collapsed, of the FIG. 2 baby carriage.

FIG. 2 is a perspective view of a framework of an example of a baby carriage wherein the present invention can be advantageously employed. The baby carriage shown is of a collapsible or foldable type baby carriage and accordingly FIG. 3 shows a side view of the framework of the FIG. 2 baby carriage in a collapsed state. First the framework and the collapsing scheme of the baby carriage shown will be described, while a structure associated with a hammock constituting a major portion of the present invention will be described thereafter.

The baby carriage shown comprises front legs 11, from which pushing rods 12 are integrally provided to extend upward and are curved at the upper ends to form grips 13. Front wheels 14 are rotatably mounted at the lower ends of the front legs 11. Hammock supporting rods 15 are pivotally provided at pivotting points 16 to the pushing rods 12, whereby a hammock 17, as shown by a phantom line, is supported, as to be more fully described subsequently. A belt 18 is made of a flexible or bendable material and fixed at both ends thereof to the front legs 11. Since the belt 18 is also provided associated with the hammock 17, the same also will be described in more detail subsequently. Front support rods 19 are pivotally coupled at one end thereof to the corresponding front legs 11 and are pivotally coupled at the other ends thereof to a joint 20, so that a link implemented by the joint 20 and the front support rods 19 may be folded upward. Rear legs 21 are pivotally provided at one end thereof to the pushing rods 12 by means of fixing members 22 and rear wheels 23 are rotatably provided at the other end thereof. First connecting rods 24 are pivotally coupled at one end thereof to the front legs 11 and are pivotally coupled at the other end thereof to one end of second connecting rods 25. The second connecting rods 25 are pivotally coupled at the other end thereof to the rear legs 21. Connecting bars 26 pivotally coupled at one end thereof to the first connecting rods 24 are pivotally coupled at the other end thereof to outer extended end of the front support rods 19 as extended outward from the pivotal points where the front support rods 19 are pivotally coupled to the front legs 11. Cross linking bars 27 are pivotally coupled to cross in an X letter shape and are pivotally coupled at the upper end thereof to the pushing rods 23 by means of L letter shaped fixing members 28 and also pivotally coupled at the lower end thereof to the rear legs 21 by means of U letter shaped fixing members 29. Paired rear support rods 30 are provided such that each of the rods 30 is pivoted to the cross linking bar 27 at the outer end of the paired rear support rods 30 and is jointed to each other at the other end of the rod 30 so as to be upwardly foldable. One of the rear support rods is provided with a stopper piece 31 to prevent the paired rear support rods 30 from being downwardly folded. A manual knob 32 is provided so as to be protruded rearwardly and coaxially with the pivotal point of the paired rear support rods 30.

Now a collapsing operation of the embodiment shown will be described in the following. In the opened state as shown in FIG. 2, the paired front support rods 19 and the paired rear support rods 30 are each placed in a straightened arrangement, respectively, so that the front legs 11 and thus the pushing rods 12, and the rear legs 21 are placed in the most spaced state, while the rear legs 21 are placed in a state to assume the largest crossing angle with respect to the front legs 11. In order to collapse the baby carriage from the above described state, first of all the manual knob 32 is pulled upward, so that the rear support rods 30 may be folded upwardly. Accordingly, the cross linking bars 27 are turned, such that the pushing rods 12 become close to each other while the rear legs 21 also come close to each other and the rear legs 21 are turned downward to decrease the crossing angle between the rear legs 21 and the front legs 11. Accordingly, the pivotal joint of each first connecting rod 24 and each second connecting rod 25 is downwardly displaced, thereby to depress each connecting bar 26 downward. This operation of the connecting bar 26 depresses the outer end of each front support rod 13, whereby the paired front support rods 19 are folded such that the joint 20 is displaced upward. The above described series of operations progress to eventually achieve the collapsed state as shown in FIG. 3. In such collapsed state, the front legs 11 and the rear legs 21 have become closest to each other, while the pushing rods 12 and thus the front legs 11 and the rear legs 21 have become closest to each other. The belt 18 will not be an obstacle to such collapsing operation, inasmuch as the belt 18 is made of a bendable or elastic material. The hammock is also structured so as not to be an obstacle to the above described collapsing operation, as to be more fully described subsequently.

Figure 4:
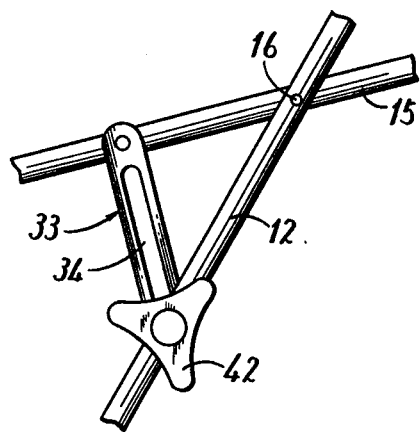
FIG. 4 is an enlarged side view of the portion marked A in FIG. 2.
Figure 5:
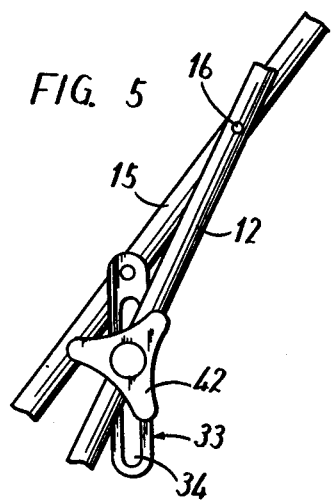
FIG. 5 is a side view showing the portion marked A in a state different from that shown in FIG. 4.
Figure 6:
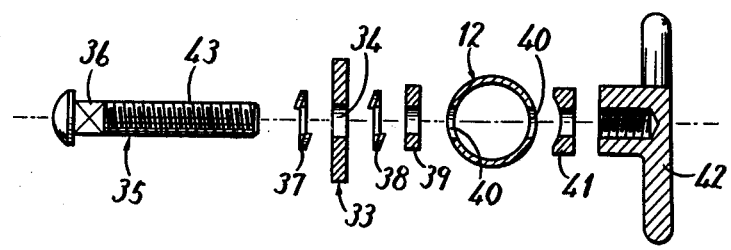
FIG. 6 is a sectional view showing a disassembled state of a major portion of those shown in FIGS. 4 and 5.

Now a structure in conjunction with the hammock 17 constituting an essential feature of the present invention will be described. FIG. 4 is an enlarged side view of a portion marked A in FIG. 2. FIG. 5 is a side view of the portion marked A in a state different from that shown in FIG. 4. FIG. 6 is a disassembled sectional view of a major portion of those shown in FIGS. 4 and 5. Those shown in FIGS. 4 and 5 constitute a scheme for adjusting the crossing angle of the hammock supporting rods 15 with respect to the pushing rods 12 and for fixing at any desired angular position.

Referring to FIGS. 4 to 6, an adjusting link 33 is pivotally mounted at one end thereof to the hammock supporting rod 15 and is formed of an elongated aperture 34 extending in the longitudinal direction thereof. A bolt 35 having a rectangular sectional portion 36 is inserted to the above described elongated aperture 34 and is further inserted to spring washers 37 and 38, a washer 39, an aperture 40 of the pushing rod 12 and further to a washer 41 and then a knob nut is threaded to a screw portion 43 of the bolt 35. Accordingly, when the knob nut 42 is loosened by turning the same, the adjusting link 33 becomes displaceable with respect to the bolt 35 along the elongated aperture 34 and when the knob nut 42 is fastened, the adjusting link is fixed to the bolt 35 at a desired position of the elongated aperture 34.

Thus, the hammock supporting rods 15 may be turned such that the crossing angle thereof with respect to the pushing rods 12 may be changed and then the hammock supporting rods 15 may be fixed at a desired position of a changed crossing angle. FIG. 4 shows a case where the hammock supporting rods 15 have been replaced in an attitude closest to the horizontal line, in which the most reclined state of the hammock 17 to be described subsequently is achieved. On the other hand, FIG. 5 shows a case where the hammock supporting rods 15 have been brought to a raised attitude turned from the FIG. 4 attitude, although the hammock supporting rods 15 may be more raised than shown according to the embodiment shown. In such a raised attitude of the hammock supporting rods 15, a chair sitting like state of the hammock 17 can be achieved.

Now a structure of the hammock 17 being supported by the above described tiltable hammock supporting rods 15 will be described in the following.

Figure 7:
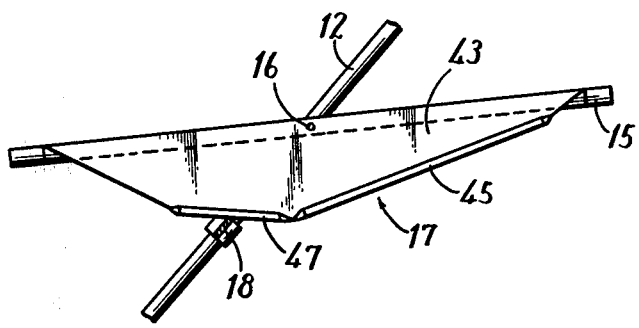
FIG. 7 is a diagrammatic sectional view of a hammock supported by hammock supporting rods shown in FIG. 2.
Figure 8:
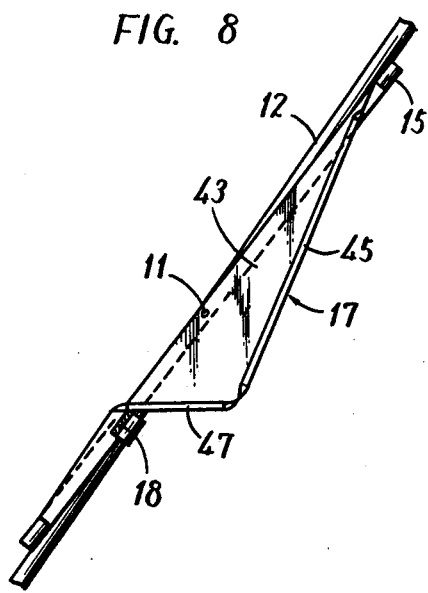
FIG. 8 is a diagrammatic sectional view of the hammock in a state different from that shown in FIG. 7.
Figure 9:
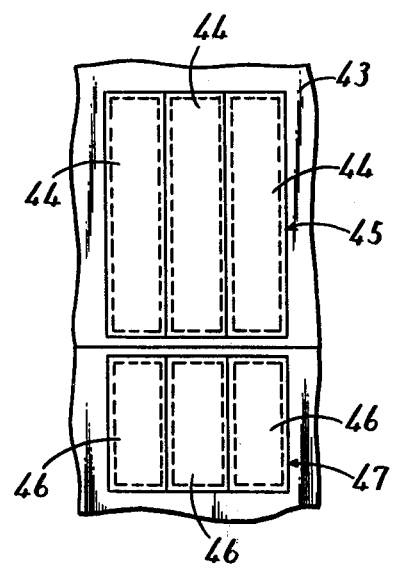
FIG. 9 is a partial plan view for explaining the structure of the hammock.

FIG. 7 is a diagrammatic sectional view of the hammock 17 and FIG. 8 is a diagrammatic sectional view of the hammock 17 in a state different from the that shown in FIG. 7. FIG. 9 is a partial plan view of the hammock 17 for explaining the structure thereof. Referring to FIGS. 7 to 9, the hammock 17 comprises a sheet 43 made of a material such as cloth sheet, which is fixed to the hammock supporting rods 15 with the opposite side edges folded to wrap the hammock supporting rods 15 and stitched. The sheet 43, as spread between both hammock supporting rods 15, has been afforded a slack enough to provide a dish shaped curve. With particular reference to FIG. 9, the sheet 43 is provided at a relative upper half portion thereof with three hard core materials 44 extending in the longitudinal direction at a central portion of the sheet 43 in a juxtaposed manner. The portion of the sheet 43 where the above described three hard core materials 44 constitute a back portion 45 of the hammock. Similarly, the sheet 43 is provided at a relative lower portion with three hard core materials 46 extending in the longitudinal direction at a central portion of the sheet 43 in a juxtaposed manner. The portion of the sheet 43 where the above described three core materials 46 constitute a sitting portion 47 of the hammock 17. It should be noted that such division of core materials 44 and 46 into say three will obviate an obstacle to a collapsing operation of the above described baby carriage. Nevertheless, an arrangement of the above described core materials 44 and 46 can achieve a necessary hardness of the back portion 45 and the sitting portion 47 of the hammock 17.

Now the reclining mechanism of the hammock 17 will be described. Referring to FIG. 7, the sheet 43 curved in a dish shape extending from the hammock supporting rods 15 is supported by means of the belt 18 at the lower surface of the sitting portion 47 where the core materials 46 are provided. If and when the hammock supporting rods 15 are brought to a raised attitude from this state by means of the above described means, the sitting portion 17 slides at the lower surface thereof on the belt 18, while the sheet 43 is deformed with wrinkles formed by virtue of bendability thereof, whereby the shape and posture of the hammock as shown in FIG. 8 are achieved eventually. In such a state, the belt 38 supports the sitting portion 47 at the lowermost end of the core materials 46, while the sitting portion 47 assumes substantially a horizontal attitude, whereby a sitting posture of the hammock is achieved. Although FIGS. 7 and 8 show the states of two extremities, any intermediary state can be assumed, when the hammock supporting rods 15 are brought to an intermediary angular position, while the belt 18 supports the lower surface of the sitting portion 47 to serve as a supporting base. Accordingly, the sitting portion 47 always assumes substantially a horizontal attitude irrespective of a change of the tilt angle of the hammock 17, thereby to meet the above described safety standard.

Figure 10:
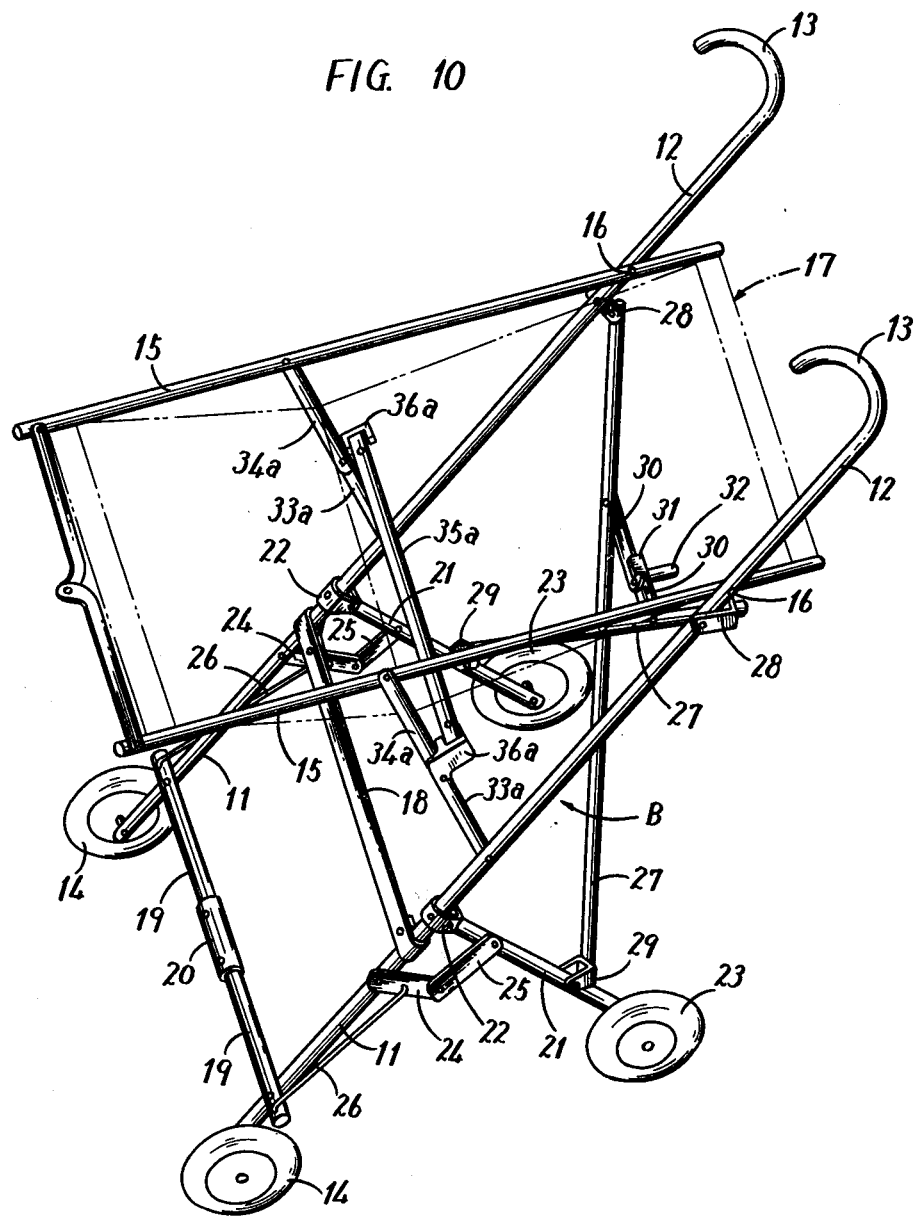
FIG. 10 is a perspective view of a framework of a baby carriage for explaining an outline of another embodiment of the present invention.

FIG. 10 is a perspective view showing a framework of a baby carriage in accordance with another embodiment of the present invention. FIG. 11 is a side view showing the framework in a collapsed state of the FIG. 10 baby carriage. Since the framework of the carriage body of the baby carriage shown in FIGS. 10 and 11 is substantially the same as that shown in FIGS. 2 and 3, except for those points to be described in the following, like portions have been denoted by like reference characters and a description thereof will be omitted. Thus only the different points will be described in the following. A first connecting rod 33a and a second connecting rod 34a are provided to be foldable at each of the pushing rods 12. A belt 35a is suspended between the first connecting rods 33a at both sides. Instead, the adjusting links 33 and so on have not been provided. The rear support rods 30 have been shifted to a relatively upper position of the cross linking bars 27.

Now the structure in conjunction with the hammock 17 constituting an essential feature of the present invention will be described. FIG. 12 is an enlarged side view of the portion marked B in FIG. 10. FIG. 13 is a side view of the portion marked B in a state different from that shown in FIG. 12. Those shown in FIGS. 12 and 13 constitute a scheme for changing the crossing angle of the hammock supporting rods 15 with respect to the pushing rods 12. Referring to FIGS. 12 and 13, the first connecting rods 33a are pivotally coupled at one end thereof to the pushing rods 12 and are pivotally coupled at the other end thereof to one end of the second connecting rods 34a. The second connecting rods 34a are pivotally coupled at the other end thereof to the hammock supporting rods 15. The first connecting rods are formed, at the other end thereof, of protruding pieces 36a, respectively. As shown in FIG. 12, the protruding pieces 36a abut against the second connecting rods 34a if and when the first and second connecting rods 33a and 34a are brought to a straightened position, thereby to insure that the first and second connecting rods 33a and 34a are folded only in one direction. Although not shown precisely in FIG. 12, the structure should be preferably adapted such that the protruding pieces 36a abut against the second connecting rods 34a if and when the dead point achieved by the first and second connecting rods 33a and 34a is exceeded in order to maintain the above described straightened line position when a load is applied to the hammock supporting rods 15. The protruding pieces 36a also serve to fix the belt 35a (see FIG. 10).

Since the hammock supporting rods 15 are thus provided, when both the connecting rods 33a and 34a are folded in such direction that the protruding pieces 36a are separated from the second connecting rods 34a, the crossing angle between the hammock supporting rods 15 and the pushing rods 12 decreases. FIG. 13 shows a midway state of such change. If and when the above described crossing angle further decreases from the state shown in FIG. 13, the hammock supporting rods 15 and the pushing rods 12 become closest to each other and such a state is maintained by abutment of the hammock supporting rods 15 against the belt 18 (see FIG. 10).

Figure 14:
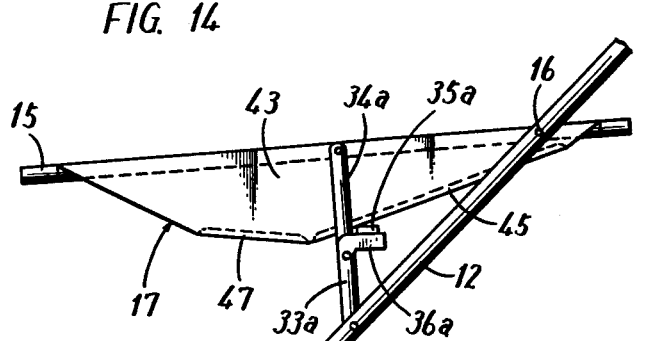
FIG. 14 is a diagrammatic side view of a hammock supported by hammock supporting rods shown in FIG. 10.
Figure 15:
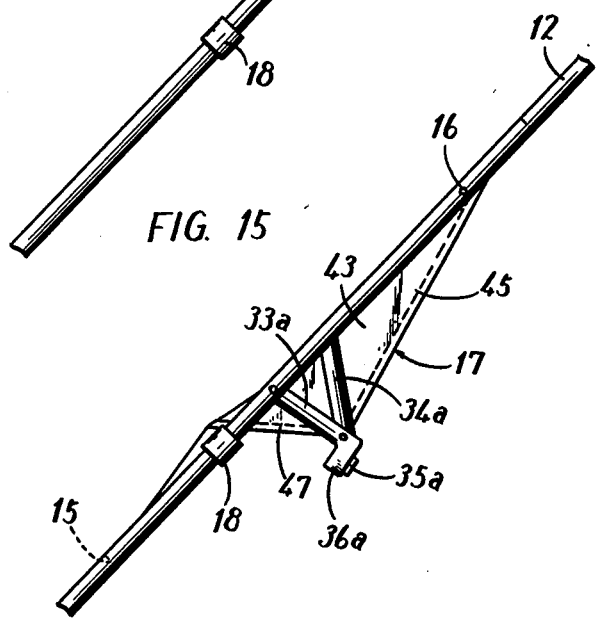
FIG. 15 is a diagrammatic side view of the hammock in a state different from that shown in FIG. 14.

Now a reclining scheme of the hammock 17 carried by the hammock supporting rods 15 for changing the tilt angle will be described. FIG. 14 is a diagrammatic side view of the hammock 17 and FIG. 15 is a diagrammatic side view of the hammock in a state different from that shown in FIG. 14. Referring to FIG. 14, the sheet as slacked and curved in a dish shape on the hammock supporting rods 15 is supported with the belt 35a in contact with the lower surface of the back portion 45 where the core materials 44 are provided. If and when the hammock supporting rods 15 are raised from such a state by means of the above described means, the belt 35a becomes separated and the belt 18 comes in contact with the lower surface of the sitting portion 47 this time. If and when the hammock supporting rods 15 are further raised after the belt 18 has thus come in contact with the lower surface of the sitting portion 47, the lower surface of the sitting portion 47 slips over the belt 18, while the sheet 43 is deformed by virtue of the wrinkles thereof formed as a function of the bendability thereof, whereby a state as shown in FIG. 15 is achieved eventually. In such a state, the lower surface of the sitting portion 47 is in contact with and supported by the belt 18, so that the sitting portion 47 keeps substantially a horizontal attitude, thereby to achieve a sitting state of the hammock 17.

Figure 16:
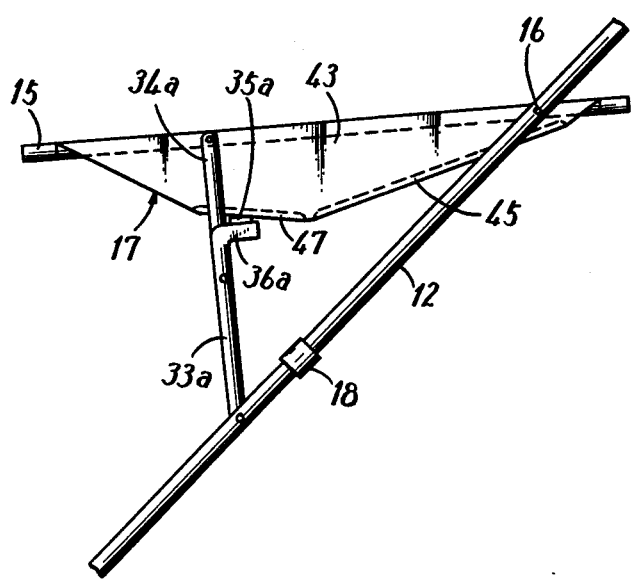
FIG. 16 is a view for explaining a further embodiment of the present invention.

FIG. 16 is a diagrammatic side view of the hammock 17 for explaining a further embodiment of the present invention. FIG. 16 is similar to FIG. 14 and therefore like portions have been denoted by the same reference characters as used in conjunction with FIG. 14. Thus, a description of those like portions is omitted. In the embodiment shown, the first and second connecting rods 33a and 34a are provided below the belt 18, so that when the hammock 17 is placed in a reclined state, the belt 35a comes in contact with the lower surface of the sitting portion 47. Even in case of the embodiment shown, a reclined state of the hammock 17 can be properly maintained. Thus, it would be appreciated that the structure may be such that in a reclined state of the hammock 17 either the sitting portion 47 or the back portion 45 may be supported. The reason is that the sitting portion 47 and the back portion 45 are formed by providing the hard core materials 44 and 46.

Figure 17:
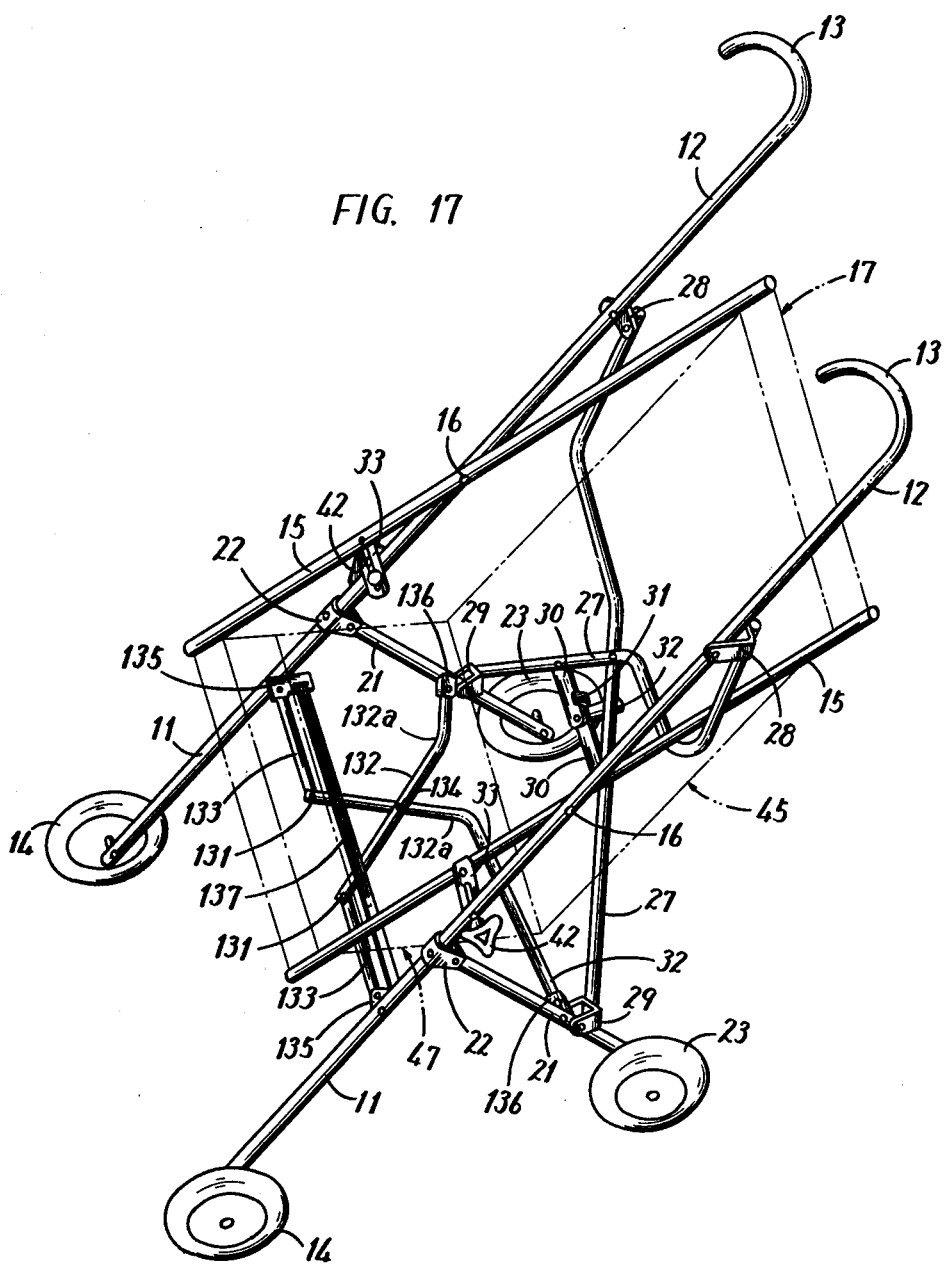
FIG. 17 is a perspective view showing a framework of another example of a baby carriage wherein the present invention can be advantageously employed and for use in explaining an outline of still a further embodiment of the present invention.
Figure 18:
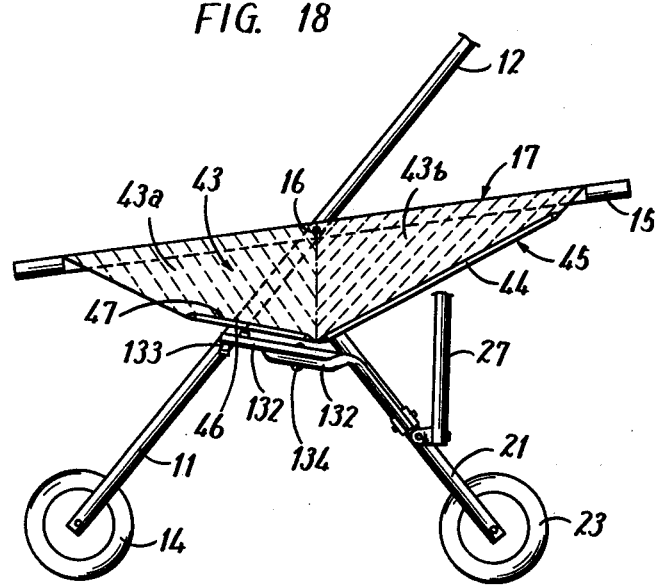
FIG. 18 is a diagrammatic side view of a hammock supported by hammock supporting rods shown in FIG. 17.
Figure 19:
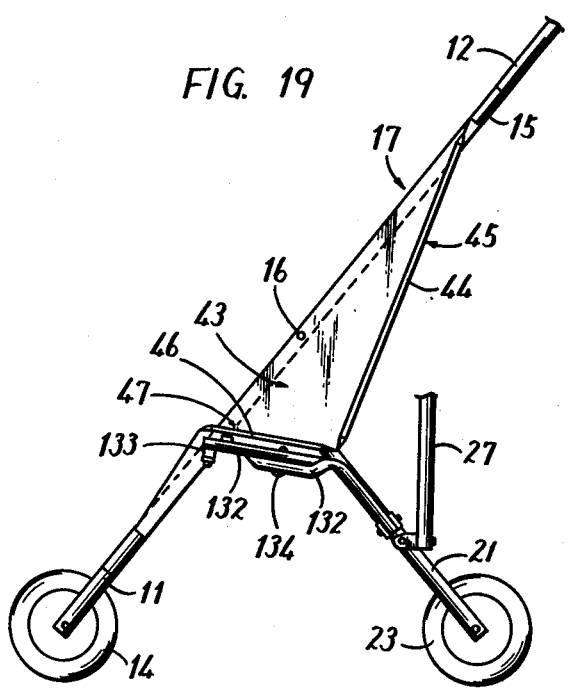
FIG. 19 is a diagrammatic side view of the hammock in a state different from that shown in FIG. 18.

FIGS. 17 to 19 are views for explaining still a further embodiment of the present invention. FIG. 17 is a perspective view showing a framework of the embodiment in an opened state. First referring to FIG. 17, a portion of the framework different from that shown in FIG. 2 will be described in the following. Meanwhile, it is pointed out that the same portions as those shown in FIG. 2 have been denoted by the same reference characters. With reference to FIG. 17 with comparative reference to FIG. 2, first of all it is pointed out that those corresponding to the front support rods 19, the joint 20, the first connecting rods 24, the second connecting rods 25 and the connecting bars 26 have not been provided in the embodiment shown in FIGS. 17 to 19. Instead, the front legs 11 and the rear legs 21 are coupled in a crossed fashion by means of lateral long rods 132 and lateral short rods 133, with the rods being mated 132 and 133 jointed at the joint points 131. Both the lateral long rods 132 are pivotally jointed at a pivotal point 134 so as to be crossed in an X letter shape. The lateral long rods 132 are pivotally coupled to the rear legs 21 by means of fixing members 136. The lateral short rods 133 are pivotally coupled to the front legs 11 by means of fixing members 135. Preferably, a belt 137 made of an elastic material is provided between both the fixing members 135. The lateral long rods 132 are bent at bending portions 132a, so that a plane including both the lateral long rods 132 at least in the vicinity of the joint point 134 may be substantially horizontal (but slightly inclined downward rearwardly). Such a state of the lateral long rods 132 is better shown in FIGS. 18 and 19, as to be described subsequently.

One feature of the embodiment shown is that the sitting portion 47 of the hammock 17 is disposed in conjunction with the lateral long rods 132 and the lateral short rods 133. This will be described in more detail in the following. FIG. 18 is a side view of the embodiment in an opened state, with those elements at the front side of the drawing sheet omitted for simplicity of illustration. FIG. 19 is a side view similar to that shown in FIG. 18 but in a state different from that shown in FIG. 18. Referring to FIG. 18, the sheet 43 as slacked and curved in a dish shape from the hammock supporting rods 15 is placed such that the lower surface of the sitting portion 47 where the core materials 46 are provided is positioned in the vicinity of and above the plane including the lateral long and short rods 132 and 133, as crossed, and the belt 137. Accordingly, if and when a baby sits on the hammock 17, the sitting portion 47 comes into contact with, as a function of the weight of the baby, and is supported by the upper surface of the lateral long and short rods 132 and 133 and the belt 137. If and when the hammock supporting rods 15 are raised in the previously described manner from such a state, the lower surface of the sitting portion 47 slides on the plane including the crossing portion of the lateral long rods 132, the lateral short rods 133 and the belt 137, while the sheet 43 is deformed as a function of the wrinkles formed by virtue of the bendability thereof, whereby a state as shown in FIG. 19 is eventually achieved. In such a state, the lower surface of the sitting portion 47 is positioned in the vicinity of and above the plane including the crossing portion of the lateral long rods 132, the lateral short rods 133 and the belt 137, so that the lower surface of the sitting portion 47 comes in contact with, when a baby sits thereon, and is supported thereby. Although FIGS. 18 and 19 show the state of two extremities, even in an intermediary reclined state of the hammock, the sitting portion 47 is placed above and in the vicinity of the above described plane including the crossing portion of the lateral long rods 132 and so on, whereby the said plane functions to support the sitting portion 47 of the hammock. As a result, irrespective of a tilt angle of the hammock 17, the sitting portion 47 can always assume substantially a horizontal attitude.

Now consider in more detail a manner of deformation of the sheet 43 of the hammock 17 with reference to FIGS. 18 and 19. Deformation of the sheet 47 occurring between the state shown in FIG. 18 and the state shown in FIG. 19 mainly occurs at a portion 43a as hatched by dotted lines in FIG. 18 and little at a portion 43b. More specifically, many wrinkles are formed at the portion 43a and the sheet 43 is warped at the lowermost end of the sitting portion 47, thereby to allow for deformation of the hammock 17 per se, while the shape (a triangle) as viewed from the side is substantially kept at the portion 43b. Accordingly, the sitting portion 47 can smoothly slide on the surface including the crossing portion of the lateral long rods 132 and so on, as the hammock supporting rods 15 are turned.

It would be appreciated that the above described embodiment made it possible that a link structure (of the lateral long rods 132 and the lateral short rods 133) functions as a base for supporting the sitting portion 47 of the hammock by proper deformation and proper positioning of the link in association with a collapsing scheme of the baby carriage per se.

In the foregoing the present invention was described as embodied in a collapsible baby carriage of those types as shown in the figures. However, it should be pointed out that the present invention can also be applied to baby carriages of not only these collapsing schemes but also of any other collapsing types and even to baby carriages without any collapsing scheme. More specifically, the present invention can be applied to any types of baby carriages comprising a pair of left and right hammock supporting rods pivotally coupled to a carriage body of the baby carriage and a hammock shaping member supported by a vehicle body of the baby carriage. Accordingly, although in the above described first embodiment the belt 18 serving as a hammock shaping member was made of a bendable material in order to allow for collapsing, the same should not be construed by way of limitation, inasmuch as a hammock shaping member may be made of a solid material and may be fixed to a carriage body of the baby carriage.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A baby carriage, comprising:

a carriage body including a pair of left and right members, a plurality of wheels rotatably mounted to the lower ends of said carriage body for rotation on the ground, a pair of left and right hammock supporting rods extending in parallel with each other and pivotally provided to said pair of left and right members, respectively, the axis of said pivotal provision extending along a line running between said pair of left and right members, said pair of hammock supporting rods being turnable about said axis of said pivotal provision, means for selectively fixing said turning of said pair of hammock supporting rods, a hammock supported by and spread between said pair of left and right hammock supporting rods, and a hammock shaping member coupled to said carriage body extending substantially in the lateral direction thereof to be in selective contact with the lower surface of said hammock for shaping said hammock, said hammock comprising a sheet fixed at the both side edges to said pair of left and right hammock supporting rods so as to be curved in a dish shape with a slack between said pair of left and right hammock supporting rods, a sitting portion including a relatively hard core member fixed at a central portion of said sheet between said pair of hammock supporting rods, and a back portion including a relatively hard core member fixed adjacent to said sitting portion and at a central portion of said sheet between said pair of hammock supporting rods, whereby a tilt angle of said back portion is changed in accordance with turning of said pair of left and right hammock supporting rods as pivotally provided and thus the crossing angle between said sitting portion and said back portion is changed while said hammock shaping member is in contact with and supports said hammock.

2. A baby carriage in accordance with claim 1, wherein said pair of left and right members comprise a pair of left and right bar rods.

3. A baby carriage in accordance with claim 2, wherein said pair of left and right bar rods comprises a pair of left and right pushing rods extending from a rear upper position to a front lower position.

4. A baby carriage in accordance with claim 2, wherein said means for selectively fixing said pair of left and right hammock supporting rods comprises a link constituting one side of a triangle the remaining two sides of which are defined by said hammock supporting rod and said bar rod provided to cross said hammock supporting rod, one end of said link being pivotally coupled to said hammock supporting rod, and the other end of said link being selectively fixed by means of a screw member inserted into an elongated aperture formed on said link and fastened to said bar rod, whereby the angle between said pair of hammock supporting rods and said pair of bar rods is arbitrarily changed and fixed.

5. A baby carriage in accordance with claim 1, wherein said means for selectively fixing said pair of left and right hammock supporting rods comprises foldable connecting rods pivotally coupled at one end to said pair of left and right members and pivotally coupled at the other end to said pair of left and right hammock supporting rods, whereby said pair of left and right hammock supporting rods can be fixed to a first posture achieved by said connecting rods being placed in a straightened state or to a second posture achieved by said connecting rods being placed in a folded state.

6. A baby carriage in accordance with claim 5, wherein said hammock shaping member is adapted to be in contact with and supports the lower surface of said sitting portion when said hammock supporting rods are placed in said second posture.

7. A baby carriage in accordance with claim 6, wherein said hammock shaping member is supported to extend in the lateral direction while the both ends thereof are fixed in the vicinity of a folding joint of said connecting rods, and wherein said shaping member comprises a supporting base in contact with either of said sitting portion and said back portion for maintaining said sitting portion and said back portion in an increased crossing angle when said hammock supporting rods are placed in said first posture.

8. A baby carriage in accordance with claim 1, wherein said carriage body includes means enabling lateral collapse, such that said pair of left and right members are rendered close to each other, said pair of left and right hammock supporting rods are rendered close to each other, while said hammock is made narrow in width with the wrinkles formed therein and wherein said hammock shaping member is flexible.

9. A baby carriage in accordance with claim 8, wherein said hard core members provided in said back portion and said sitting portion comprise a plurality of pieces elongated in the longitudinal direction of said hammock.

10. A baby carriage in accordance with claim 8, wherein said hammock shaping member comprises an elastic belt.

11. A baby carriage in accordance with claim 1, wherein said hammock shaping member is adapted to be in sliding contact with the lower surface of said sitting portion, whereby the tilt angle of said back portion is changed and the sitting portion slides on said hammock shaping member, whereby the crossing angle between said sitting portion and said back portion is changed, as said pair of hammock supporting rods are turned.

* * * * *